(12) United States Patent
Sharma et al.

(10) Patent No.: US 12,541,454 B2
(45) Date of Patent: Feb. 3, 2026

(54) VARIABLE DISPATCH WALK FOR SUCCESSIVE CACHE ACCESSES

(71) Applicants: ADVANCED MICRO DEVICES, INC., Santa Clara, CA (US); ATI TECHNOLOGIES ULC, Markham (CA)

(72) Inventors: Saurabh Sharma, Santa Clara, CA (US); Jeremy Lukacs, Santa Clara, CA (US); Hashem Hashemi, Roseville, CA (US); Gianpaolo Tommasi, Santa Clara, CA (US); Guennadi Riguer, Markham (CA); Mark Fowler, Boxborough, MA (US); Randy Ramsey, Orlando, FL (US)

(73) Assignees: Advanced Micro Devices, Inc., Santa Clara, CA (US); ATI TECHNOLOGIES ULC, Markham (CA)

(*) Notice: Subject to any disclaimer, the term of this patent is extended or adjusted under 35 U.S.C. 154(b) by 0 days.

(21) Appl. No.: 17/558,008

(22) Filed: Dec. 21, 2021

(65) Prior Publication Data

US 2023/0195626 A1  Jun. 22, 2023

(51) Int. Cl.
G06F 12/0806 (2016.01)
G06F 12/10 (2016.01)

(52) U.S. Cl.
CPC .......... *G06F 12/0806* (2013.01); *G06F 12/10* (2013.01); *G06F 2212/1016* (2013.01)

(58) Field of Classification Search
CPC ............... G06F 12/1027; G06F 12/084; G06F 12/0875; G06F 2212/1016;
(Continued)

(56) References Cited

U.S. PATENT DOCUMENTS 7,681,014 B2  3/2010 Jensen et al.
9,514,506 B2  12/2016 Lee et al.
(Continued)

FOREIGN PATENT DOCUMENTS

KR   10-1799978   11/2017

OTHER PUBLICATIONS

International Search Report and Written Opinion issued in Application No. PCT/US2022/053381, mailed Apr. 21, 2023, 11 pages.
(Continued)

*Primary Examiner* — Jared I Rutz
*Assistant Examiner* — Edward Waddy, Jr.

(57) ABSTRACT

A processing system is configured to translate a first cache access pattern of a dispatch of work items to a cache access pattern that facilitates consumption of data stored at a cache of a parallel processing unit by a subsequent access before the data is evicted to a more remote level of the memory hierarchy. For consecutive cache accesses having read-after-read data locality, in some embodiments the processing system translates the first cache access pattern to a space-filling curve. In some embodiments, for consecutive accesses having read-after-write data locality, the processing system translates a first typewriter cache access pattern that proceeds in ascending order for a first access to a reverse typewriter cache access pattern that proceeds in descending order for a subsequent cache access. By translating the cache access pattern based on data locality, the processing system increases the hit rate of the cache.

19 Claims, 5 Drawing Sheets

(58) Field of Classification Search
CPC ......... G06F 2212/1024; G06F 12/1009; G06F 12/0802; G06F 12/0888; G06F 15/8069; G06F 12/1045; G06F 12/08; G06F 12/0806; G06F 12/10
USPC ...... 711/118, 128, 105, 122, 12.049, 12.018, 711/137, 12.057, 12.001
See application file for complete search history.

(56) References Cited

U.S. PATENT DOCUMENTS

| | | | |
|---|---|---|---|
| 9,615,104 B2 | 4/2017 | Wu et al. | |
| 10,037,149 B2* | 7/2018 | Nazarov | G06F 3/068 |
| 10,261,903 B2 | 4/2019 | Sakthivel et al. | |
| 10,402,224 B2 | 9/2019 | Veernapu et al. | |
| 10,521,875 B2 | 12/2019 | Koker et al. | |
| 10,796,397 B2 | 10/2020 | Valerio et al. | |
| 11,822,956 B2 | 11/2023 | Luo et al. | |
| 11,995,737 B2 | 5/2024 | Koker et al. | |
| 2003/0200396 A1* | 10/2003 | Musumeci | G06F 12/0875 |
| | | | 712/E9.056 |
| 2006/0184747 A1* | 8/2006 | Guthrie | G06F 12/0831 |
| | | | 711/146 |
| 2009/0303245 A1 | 12/2009 | Soupikov et al. | |
| 2011/0213937 A1* | 9/2011 | Barry | G06F 9/30036 |
| | | | 711/E12.001 |
| 2012/0278558 A1* | 11/2012 | Duftler | G06F 16/9574 |
| | | | 711/E12.017 |
| 2012/0320069 A1 | 12/2012 | Lee et al. | |
| 2013/0265318 A1 | 10/2013 | Schneider | |
| 2015/0160970 A1 | 6/2015 | Nugteren et al. | |
| 2016/0239441 A1 | 8/2016 | Chun et al. | |
| 2016/0364828 A1 | 12/2016 | Valerio et al. | |
| 2017/0124742 A1* | 5/2017 | Hasselgren | G06T 7/44 |
| 2017/0178386 A1 | 6/2017 | Redshaw et al. | |
| 2018/0329712 A1* | 11/2018 | Palani | G06F 12/127 |
| 2019/0324757 A1 | 10/2019 | Valerio et al. | |
| 2020/0327060 A1* | 10/2020 | Desai | G06F 12/0868 |
| 2021/0141649 A1 | 5/2021 | Xu et al. | |
| 2022/0066931 A1* | 3/2022 | Ray | G06F 12/0811 |
| 2022/0156875 A1* | 5/2022 | Koker | G06F 9/5011 |
| 2023/0104199 A1 | 4/2023 | Volkov et al. | |

OTHER PUBLICATIONS

International Preliminary Report on Patentability issued in Application No. PCT/US2022/053381, mailed Jul. 4, 2024, 8 pages.
Office Action issued in U.S. Appl. No. 17/557,927, mailed Jun. 3, 2024, 27 pages.
Non-Final Office Action mailed Mar. 20, 2025 for U.S. Appl. No. 17/557,927, 25 pages.
Final Office Action issued in U.S. Appl. No. 17/557,927, mailed Dec. 4, 2024, 24 pages.
Extended European Search Report mailed Nov. 27, 2025 for European Application No. 22912350.0, 10 pages.

* cited by examiner

VARIABLE DISPATCH WALK FOR SUCCESSIVE CACHE ACCESSES

BACKGROUND

Parallel processing units such as graphics processing units (GPUs) and other multithreaded processing units typically implement multiple processing elements (which are also referred to as processor cores or compute units) that concurrently execute multiple instances of a single program on multiple data sets. For example, the processing elements can implement single-instruction-multiple-data (SIMD) protocols to concurrently execute the same instruction on multiple data sets using multiple processor cores.

A hierarchical execution model defines a kernel of instructions that are executed using different data sets. For example, a dispatch of a grid of work items (also referred to herein as threads or streams) accesses a data set stored at a cache of a parallel processing unit. Some data sets, such as textures, are accessed multiple times by work items of a dispatch or are modified and read by successive dispatches. However, the amount of data that can be stored at the cache is constrained by the size of the cache, and data is often evicted from the cache before it can be read by a subsequent dispatch.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
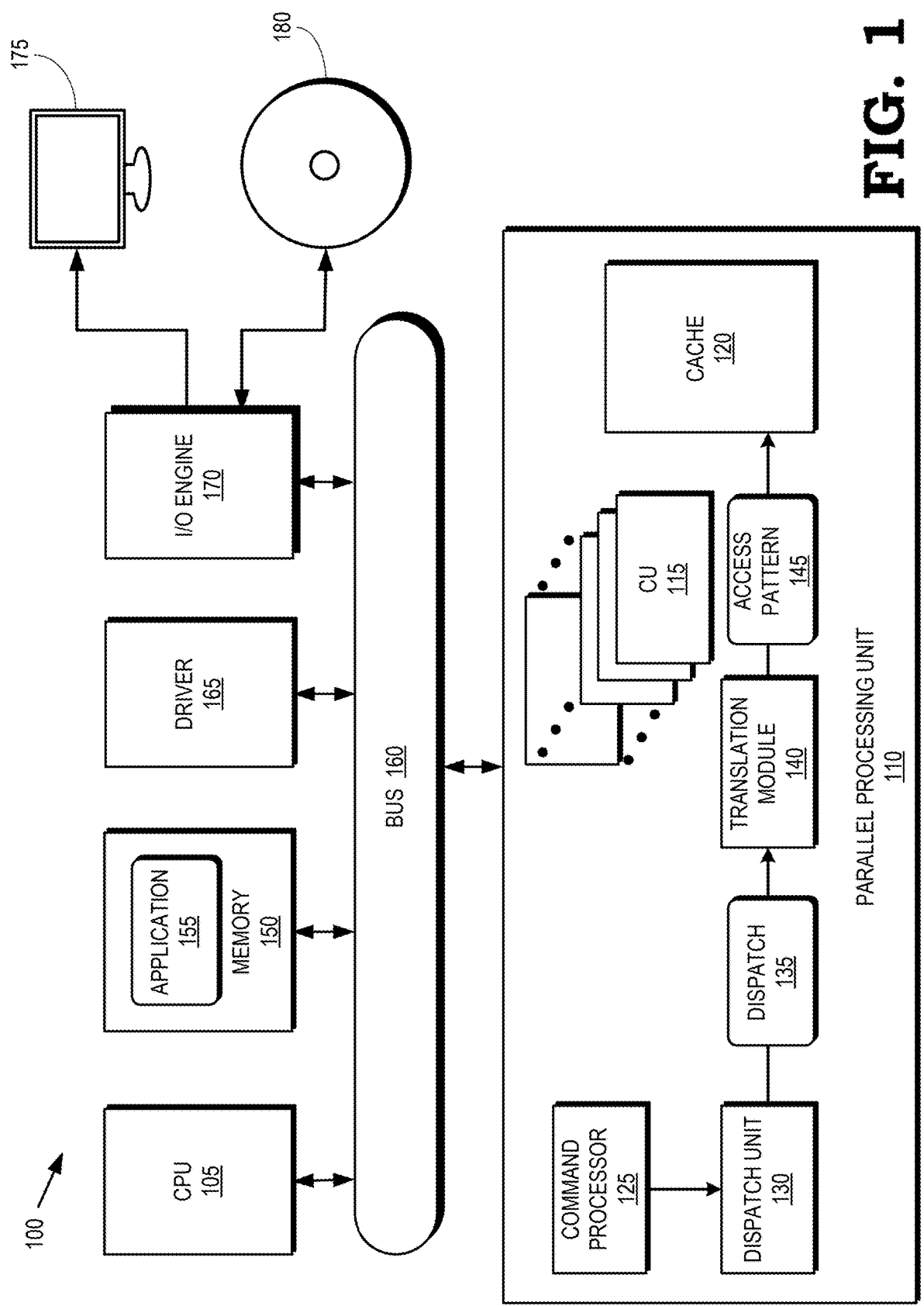
FIG. 1 is a block diagram of a processing system configured to translate an access pattern of a cache of a parallel processing unit based on locality of data accessed by successive dispatches in accordance with some embodiments.

In the course of executing instructions, a processor core of a parallel processing unit accesses data that is stored at a local cache from which accesses initiated by the processor core are performed relatively quickly and with a relatively low expenditure of energy, or at more remote level of a memory hierarchy from which accesses initiated by the processor core are performed relatively slowly and with a relatively high expenditure of energy. Typically, the more proximate to a processor core that data is stored in the memory hierarchy, the more quickly and energy-efficiently it is accessed by the processor core. To enhance processing efficiency, processing systems implement memory management protocols that govern the particular set of data stored at each level of the memory hierarchy. For example, some processing systems implement a memory management protocol that moves data that has recently been requested for access to levels of the memory hierarchy closer to the processor core, with the expectation that the data will be accessed again by the processor core in the near future and moves data that has not been accessed recently to more remote levels of the memory hierarchy.

Processor cores of parallel processing units often execute dispatches of work items that successively access the same sets of data such that spatial and/or temporal data locality exists within and between dispatches. To illustrate, a surface such as texture that is attached to a series of dispatches of work items is read in successive rendering or denoising passes. For example, a first dispatch of work items corresponding to pixels rendering objects in a scene generates global illumination, while a second dispatch of work items generates shadowing. Both the first and second dispatches require the same texture data that maps to the pixels. In some instances, work items within a dispatch read the surface multiple times in what is referred to as read-after-read locality. In other cases, work items of a first dispatch produce data such as an unordered access view (UAV) buffer or render target that is consumed by work items of a subsequent dispatch as a texture in what is referred to as read-after-write locality.

Conventionally, work items of a dispatch access data stored at the local cache in a typewriter order, starting at the lowest-index location of the cache (referred to as "0,0") and moving from left to right and top to bottom until they reach the highest-index location of the cache (referred to as "1,1"). However, by the time the subsequent dispatch of work items begins accessing the data at the cache, the least recently used data (in this example, the data in the upper left corner of the cache) may have already been evicted from the cache. Retrieving the data from more remote levels of the memory hierarchy so the data can be accessed by the subsequent dispatch consumes resources and increases latency.

FIGS. 1-5 illustrate techniques for a processing system to translate an initial cache access pattern to a cache access pattern that facilitates consumption of data stored at a cache of the parallel processing unit by a subsequent access before the data is evicted to a more remote level of the memory hierarchy. For consecutive cache accesses having read-after-read locality, in some embodiments the processing system translates the initial cache access pattern to a space-filling curve such as a Z-order space curve, a Morton space curve, or a Hilbert (or pseudo-Hilbert) space curve. A space-filling curve is a curve whose range contains an entire two-dimensional unit square, and a Z-order space curve or Morton space curve is a space-filling curve that maps multidimensional data to one dimension while preserving locality of the data points. A Hilbert space curve is a continuous fractal space-filling curve constructed as a limit of piecewise linear curves. In some embodiments, for consecutive accesses having read-after-write locality, the processing system translates an initial typewriter cache access pattern that proceeds in ascending order for a first access to a reverse typewriter cache access pattern that proceeds in descending order for a subsequent cache access. By translating the cache access pattern based on data locality, the processing system increases the probability that the data being accessed by a subsequent cache access is still resident in the cache and has not yet been evicted, thus increasing the hit rate of the cache, decreasing consumption of resources and latency, and improving the user experience.

FIG. 1 illustrates a processing system 100 configured to translate an access pattern of a cache of a parallel processing unit based on locality of data accessed by successive dispatches in accordance with some embodiments. The processing system 100 includes a parallel processing unit 110 such as a graphics processing unit (GPU) for creating visual images intended for output to a display 175 according to some embodiments. A parallel processor is a processor that is able to execute a single instruction on a multiple data or threads in a parallel manner. Examples of parallel processors include processors such as graphics processing units (GPUs), massively parallel processors, single instruction multiple data (SIMD) architecture processors, and single instruction multiple thread (SIMT) architecture processors for performing graphics, machine intelligence or compute operations. In some implementations, parallel processors are separate devices that are included as part of a computer. In other implementations such as advance processor units, parallel processors are included in a single device along with a host processor such as a central processor unit (CPU). Although the below description uses a graphics processing unit (GPU), for illustration purposes, the embodiments and implementations described below are applicable to other types of parallel processors.

The processing system 100 includes a memory 150. Some embodiments of the memory 150 are implemented as a dynamic random access memory (DRAM). However, the memory 150 can also be implemented using other types of memory including static random access memory (SRAM), nonvolatile RAM, and the like. In the illustrated embodiment, the parallel processing unit 110 communicates with the memory 150 over a bus 160. However, some embodiments of the parallel processing unit 110 communicate with the memory 150 over a direct connection or via other buses, bridges, switches, routers, and the like. The parallel processing unit 110 executes instructions stored in the memory 150 and the parallel processing unit 110 stores information in the memory 150 such as the results of the executed instructions. For example, the memory 150 can store a copy of instructions from an application 155 that is to be executed by the parallel processing unit 110. Some embodiments of the parallel processing unit 110 include multiple processor cores (referred to as compute units) 115 that independently execute instructions concurrently or in parallel.

The processing system 100 is generally configured to execute sets of instructions (e.g., computer programs) such as application 155 to carry out specified tasks for an electronic device. Examples of such tasks include controlling aspects of the operation of the electronic device, displaying information to a user to provide a specified user experience, communicating with other electronic devices, and the like. Accordingly, in different embodiments the processing system 100 is employed in one of a number of types of electronic device, such as a desktop computer, laptop computer, server, game console, tablet, smartphone, and the like. It should be appreciated that processing system 100 may include more or fewer components than illustrated in FIG. 1. For example, processing system 100 may additionally include one or more input interfaces, non-volatile storage, one or more output interfaces, network interfaces, and one or more displays or display interfaces.

The processing system 100 includes a central processing unit (CPU) 105 for executing instructions. Some embodiments of the CPU 105 include multiple processor cores (not shown in the interest of clarity) that independently execute instructions concurrently or in parallel. The CPU 105 is also connected to the bus 160 and therefore communicates with the parallel processing unit 110 and the memory 150 via the bus 160. The CPU 105 executes instructions such as program code for the application 155 stored in the memory 150 and the CPU 105 stores information in the memory 150 such as the results of the executed instructions. The CPU 105 is also able to initiate graphics processing by issuing draw calls to the parallel processing unit 110. A draw call is a command that is generated by the CPU 105 and transmitted to the parallel processing unit 110 to instruct the parallel processing unit 110 render an object in a frame (or a portion of an object). Some embodiments of a draw call include information defining textures, states, shaders, rendering objects, buffers, and the like that are used by the parallel processing unit 110 to render the object or portion thereof. The parallel processing unit 110 renders the object to produce values of pixels that are provided to a display 175, which uses the pixel values to display an image that represents the rendered object.

In some embodiments, each frame to be rendered is processed by the parallel processing unit 110 graphics pipeline in multiple passes. For example, during a first pass over the scene geometry, only the attributes necessary to compute per-pixel lighting are written to a G-buffer. During a second pass, the graphics pipeline outputs only diffuse and specular lighting data. In a third pass of the frame through the graphics pipeline, the graphics pipeline reads back lighting data and outputs the final per-pixel shading. Thus, in multi-pass rendering, a scene and associated objects of a frame are rendered multiple times. Each time the object is drawn, the graphics pipeline calculates an additional aspect of object's appearance and combines the additional aspect with the previous results. Each time the frame or objects of the frame are rendered by the graphics pipeline is referred to as a render pass.

An input/output (I/O) engine 170 handles input or output operations associated with the display 175, as well as other elements of the processing system 100 such as keyboards, mice, printers, external disks, and the like. The I/O engine 170 is coupled to the bus 160 so that the I/O engine 170 communicates with the parallel processing unit 110, the memory 150, or the CPU 105. In the illustrated embodiment, the I/O engine 170 is configured to read information stored on an external storage medium 180, such as a compact disk (CD), a digital video disc (DVD), and the like. The external storage medium 180 stores information representative of program code used to implement an application such as a video game. The program code on the external storage medium 180 can be written to the memory 150 to form a copy of instructions that are to be executed by the parallel processing unit 110 or the CPU 105.

In some embodiments, the parallel processing unit 110 implements a graphics pipeline (not shown in FIG. 1 in the interest of clarity) that includes multiple stages configured for concurrent processing of different primitives in response to a draw call. Stages of the graphics pipeline in the parallel processing unit 110 can concurrently process different primitives generated by an application, such as a video game. When geometry is submitted to the graphics pipeline, hardware state settings are chosen to define a state of the graphics pipeline. Examples of state include rasterizer state, a blend state, a depth stencil state, a primitive topology type of the submitted geometry, and the shaders (e.g., vertex shader, domain shader, geometry shader, hull shader, pixel shader, and the like) that are used to render the scene. The shaders that are implemented in the graphics pipeline state are represented by corresponding byte codes. In some cases, the information representing the graphics pipeline state is hashed or compressed to provide a more efficient representation of the graphics pipeline state.

Driver 165 is a computer program that allows a higher-level graphics computing program, such as from application 155, to interact with parallel processing unit 110. For example, the driver 165 translates standard code received from application 155 into a native format command stream understood by parallel processing unit 110. Driver 165 allows input from application 155 to direct settings of the parallel processing unit 110. Such settings include selection of a render mode, an anti-aliasing control, a texture filter control, a batch binning control, and deferred pixel shading control.

To execute the sets of commands received from the CPU, the parallel processing unit 110 includes a command processor 125, a dispatch unit 130, a plurality of compute units 115, and a cache 120. The command processor 125 is a set of hardware configured to receive the commands from the CPU 105 and to prepare the received commands for processing. For example, in some embodiments the command processor 125 buffers the received commands, organizes the received commands into one or more queues for processing, performs operations to decode or otherwise interpret the received commands, and the like.

The dispatch unit 130 is a set of hardware configured to perform dispatch operations in response to dispatch commands (not shown) received from the command processor 125. Responsive to a dispatch command, the dispatch unit 130 accesses a grid of work items and dispatches subsets (e.g., dispatch 135) of the work items to the compute units 115 for processing as a wavefront. Unlike a draw call, dispatch 135 can be processed by the parallel processing unit 110 without going through the graphics pipeline.

The plurality of compute units 115 together perform shading operations on dispatches (e.g., dispatch 135) dispatched by the dispatch unit 130. In different embodiments, the compute units 115 perform geometry operations, texture operations, tessellation operations, vertex operations, mesh operations, primitive operations, ray tracing operations, compute operations, and the like or any combination thereof, based on commands received from the command processor 125. In some embodiments, to perform these operations the compute units 115 each include one or more SIMD elements configured to execute the specified operations using the work items of the received dispatches.

The cache 120 stores data for the plurality of compute units 115. Thus, in the course of executing shader operations, the plurality of compute units 115 stores and retrieves data from the cache 120, wherein the stored and retrieved data is based on the particular work items being processed. For example, in some embodiments each work item of the dispatch 135 corresponds to an individual pixel of an image, and the cache 120 stores data (e.g., texture values) for each individual pixel, or a subset of the individual pixels, included in the dispatch 135. In some embodiments, the parallel processing unit 110 is associated with a memory hierarchy having multiple cache levels as well as a system memory 150, and the cache 120 represents one of the multiple cache levels.

To facilitate accesses to the cache 120 that leverage data locality within and between dispatches, the parallel processing unit 110 includes a translation module 140. The translation module 140 analyzes the locality of data stored at the cache 120 for dispatches such as dispatch 135 and translates an initial cache access pattern (such as a typewriter walk) to a cache access pattern 145 based on data locality of the data stored at the cache 120 for dispatches of work items of the application 155. The translation module 140 uses a list of texture resources for each dispatch to determine how the texture resources will be accessed by dispatches. For example, if a texture resource A is written by a first dispatch and read by the next dispatch, the translation module determines that read-after-write data locality exists. For sequential dispatches, typically each address in the texture resource accessed by a thread in a thread group will be the same address as the corresponding thread in a different dispatch. Within individual dispatches, neighboring work items can also read adjacent addresses. If threads access multiple addresses within a resource, the translation module 140 determines that read-after-read data locality exists.

In some embodiments, the translation module 140 contains a programmable table (not shown) which is a mapping from one value to the other. Each dispatch 135 is composed of numbered work items. For each numbered work item, a sequence value is indexed into the programmable table in the translation module 140 to produce the new sequence value. In some embodiments, the indexing is performed using an equation that generates the new sequence value given the input or by using the sequence value as an index into a table in memory.

If the translation module 140 determines that read-after-read data locality exists for dispatch 135, in some embodiments the translation module 140 translates the initial data access pattern of a typewriter walk to an access pattern 145 of a space-filling curve, such as a Morton or Hilbert space-filling curve. If the translation module 140 determines that read-after-write data locality exists for dispatch 135, in some embodiments, the translation module 140 translates the initial data access pattern of a typewriter walk to an access pattern 145 of alternating ascending and descending typewriter order for each successive dispatch 135. In some embodiments, the translation module 140 performs the translation in hardware using, e.g., a table or other structure to translate the access order to the cache 120 in a manner that is transparent to the driver 165 and other components of the parallel processing unit 110. By translating the access pattern based on data locality that exists within and between dispatches 135, the translation module 140 increases the probability that data needed for a subsequent access to the cache 120 will still be resident in the cache 120 at the time of the subsequent access, thus increasing the hit rate at the cache 120 and decreasing latency between dispatches.

Figure 2:
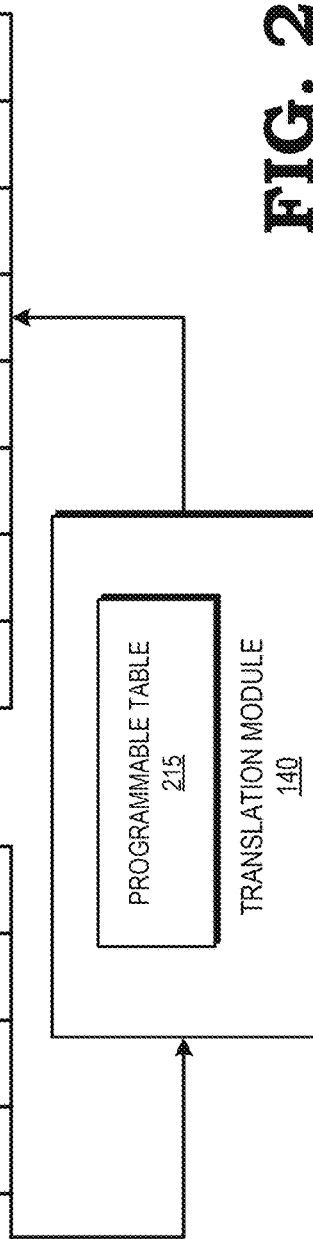
FIG. 2 is a block diagram of a translation module of the parallel processing unit translating a typewriter access pattern to a space-filling curve access pattern for successive read accesses to a texture cache within a dispatch according to some embodiments.

FIG. 2 is a block diagram 200 of the translation module 140 of the parallel processing unit 110 of FIG. 1 translating a typewriter access pattern to a space-filling curve access pattern for successive read accesses to a texture cache within a dispatch according to some embodiments. The view 205 illustrates ordering of the work items in an initial ascending typewriter mode. The work items are ordered sequentially starting from 0 in the upper left corner of the view 205 of the cache 120 and proceed through each entry of the row until reaching the right-most entry of the row, and then proceed to the left-most entry of the next row, thus progressing from left to right and top to bottom, such that the last entry, 63, is at the lower right corner of the view 205 of the cache 120.

In response to determining that read-after-read data locality exists at the cache 120 for a dispatch 135, the translation module 140 translates the initial ascending typewriter access pattern to a Morton space-filling curve illustrated in view 210. The translation module 140 translates the access pattern of the view 205 to the access pattern of the view 210 using a programmable table 215. The programmable table 215 reorders the work items of the dispatch 135 so they will access the data stored at the cache 120 in a Morton walk order. For example, in some embodiments the programmable table includes a plurality of entries, wherein each entry corresponds to a work item. Each entry of the table stores a value indicating where the corresponding work item is placed in the output pattern—that is, the order of the corresponding work item in the view 210.

The view 210 illustrates ordering of the threads in the Morton access pattern. For example, the four blocks in the upper left of the view 210 show ordering of the work items 0-3 and the four blocks in the lower right of the view 210 show the ordering of the work items 60-63. The work items are grouped into 2×2 tiles such as the tile including the four work items 0-3 that are indicated by the four blocks in the upper left of the view 210. In the view 210 of the Morton access pattern, the 2×2 tiles are arranged in 2×2 sets of 2×2 tiles that include consecutive numerals. For example, a first set includes the tiles 0-3, a second set includes the tiles 4-7, a third set includes the tiles 8-11, and a fourth set includes the tiles 12-15. The work items are arranged sequentially within each of the 2×2 tiles, e.g., the upper left-most tile includes the work items 0-3 and the lower right-most tile includes the work items 60-63. In some embodiments, to capture read-after-read data locality, the translation module 140 translates the initial ascending typewriter access pattern to a Hilbert or pseudo-Hilbert space-filling curve.

Figure 3:
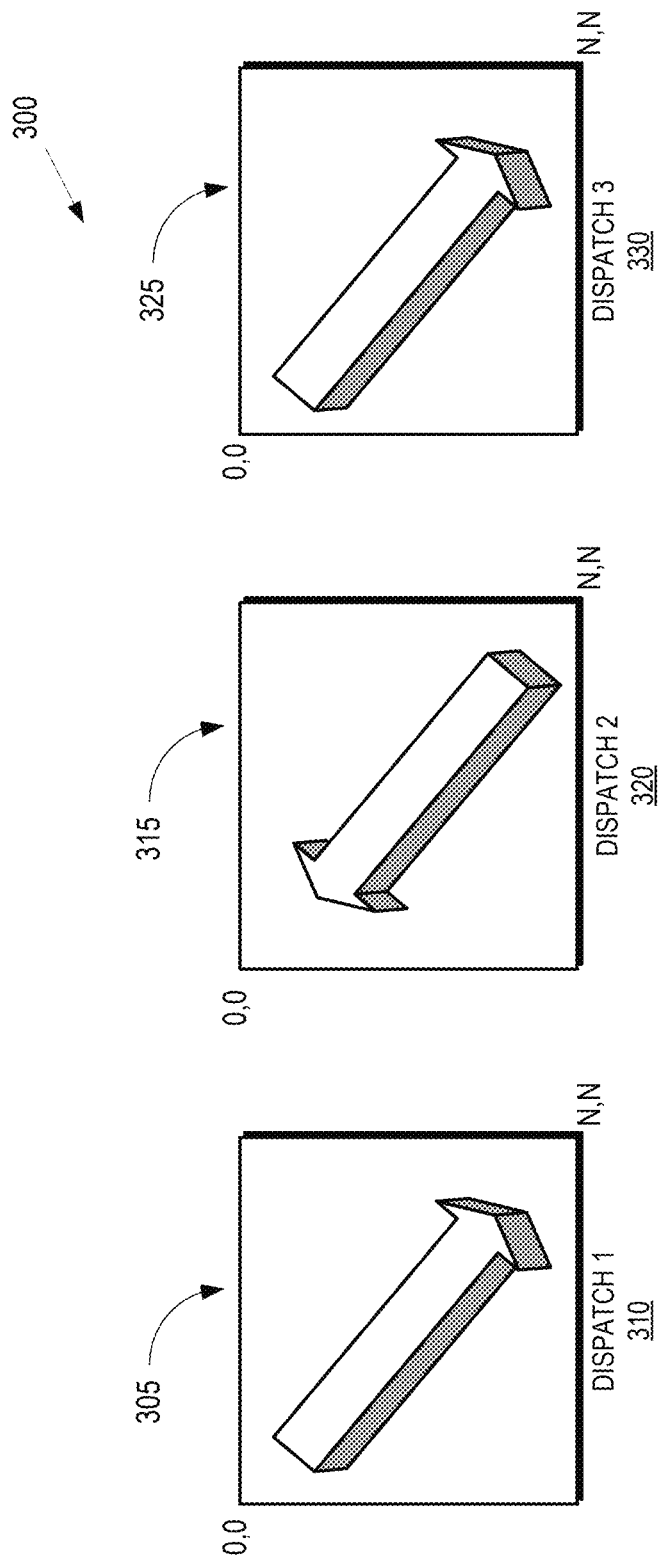
FIG. 3 is a block diagram of successive accesses to a texture cache between dispatches in alternating ascending and descending order according to some embodiments.

FIG. 3 is a block diagram 300 of views 305, 315, 325 of successive accesses to a texture cache 120 for successive dispatches in alternating ascending and descending order according to some embodiments. The view 305 illustrates ordering of the work items of dispatch 1 310 in an initial ascending typewriter mode. The work items are ordered sequentially starting from 0,0 in the upper left corner of the view 305 of the cache 120 and proceed through each entry of the row until reaching the right-most entry of the row, and then proceed to the left-most entry of the next row, thus progressing from left to right and top to bottom, such that the last entry N,N is at the lower right corner of the view 305 of the cache 120.

In response to determining that read-after-write data locality exists at the cache 120 for a subsequent dispatch, dispatch 2 320, the translation module 140 translates the initial ascending typewriter access pattern to a descending typewriter access pattern as shown in view 315. In the descending typewriter access pattern shown in view 315, the work items are ordered sequentially starting from N,N in the lower right corner of the view 315 of the cache 120 and proceed through each entry of the row until reaching the left-most entry of the row, and then proceed from the right-most entry of the next higher row, thus progressing from right to left and bottom to top, such that the last entry accessed is entry 0,0 at the upper left corner of the view 315 of the cache 120. Thus, the access order for dispatch 2 320 is the reverse of the access order for dispatch 1 310.

Under a least-recently-used cache management protocol, the least-recently-accessed entry of the cache 120 from dispatch 1 310 is the entry at 0,0, which may have already been evicted from the cache 120 by the time the work items of dispatch 2 320 begin accessing the cache 120. Therefore, reversing the access order for dispatch 2 320 allows the work items of dispatch 2 320 to consume more data produced by the work items of dispatch 1 310 before the data is evicted from the cache 120 than would be possible if the access order for dispatch 2 320 were the same as the access order for dispatch 1 310.

Similarly, in response to determining that read-after-write data locality exists between dispatch 2 320 and dispatch 3 330, the translation module 140 again reverses the access order for the work items of dispatch 3 330 with respect to the access order of dispatch 2 320. The view 325 illustrates ordering of the work items of dispatch 3 330 in an initial ascending typewriter mode. The work items are ordered sequentially starting from 0,0 in the upper left corner of the view 325 of the cache 120 and proceed through each entry of the row until reaching the right-most entry of the row, and then proceed to the left-most entry of the next row, thus progressing from left to right and top to bottom, such that the last entry N,N is at the lower right corner of the view 325 of the cache 120. Thus, the access order for dispatch 3 330 is the reverse of the access order for dispatch 2 320, allowing the work items of dispatch 3, 330 to consume more data produced by the work items of dispatch 2 320 before the data is evicted from the cache 120.

Figure 4:
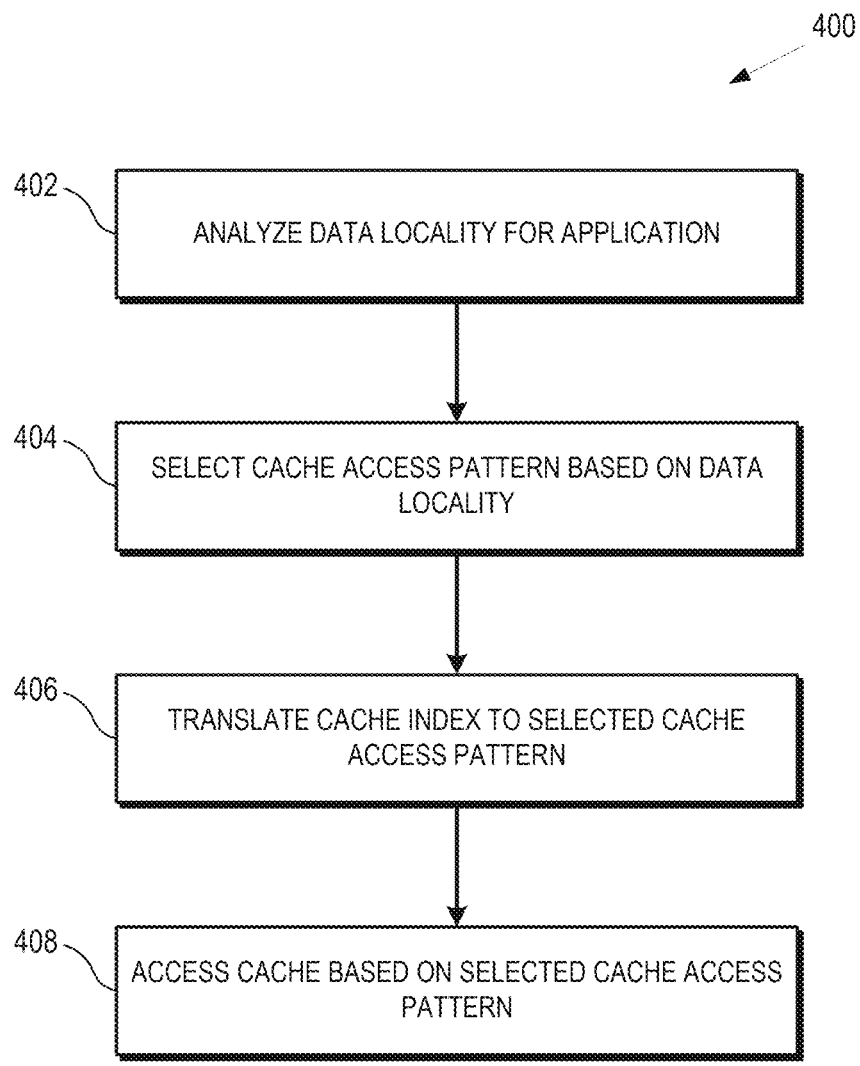
FIG. 4 is a flow diagram illustrating a method for translating a cache access pattern for a dispatch or series of successive dispatches based on data locality in accordance with some embodiments.

FIG. 4 is a flow diagram illustrating a method 400 for translating a cache access pattern for a dispatch or series of successive dispatches based on data locality in accordance with some embodiments. In some embodiments, the method 400 is performed by a processing system such as the processing system 100 illustrated in FIG. 1. At block 402, the translation module 140 analyzes the data locality within and between dispatches for the application 155. At block 404, in response to determining that data locality exists within or between dispatches 135, the translation module 140 selects a cache access pattern 145 for a dispatch 135 based on the data locality to maximize reuse of data at the cache 120 before the data is evicted. For example, in some embodiments, in response to determining that intra-dispatch (i.e., read-after-read) data locality exists, the translation module 140 selects a space-filling curve as an access pattern for a subsequent access to the cache 120. In response to determining that intra-dispatch (i.e., read-after-write) data locality exists, the translation module 140 selects an alternating ascending and descending typewriter mode as an access pattern for consecutive dispatches accessing the cache 120.

At block 406, the translation module 140 translates an initial cache access pattern to the selected cache access pattern 145 using the programmable table 215 to reorder the work items of the dispatch 135 so they will access the data stored at the cache 120 in the order of the selected cache access pattern 145. At block 408, the work items of the dispatch 135 access the cache 120 in an order based on the selected cache access pattern 145.

Figure 5:
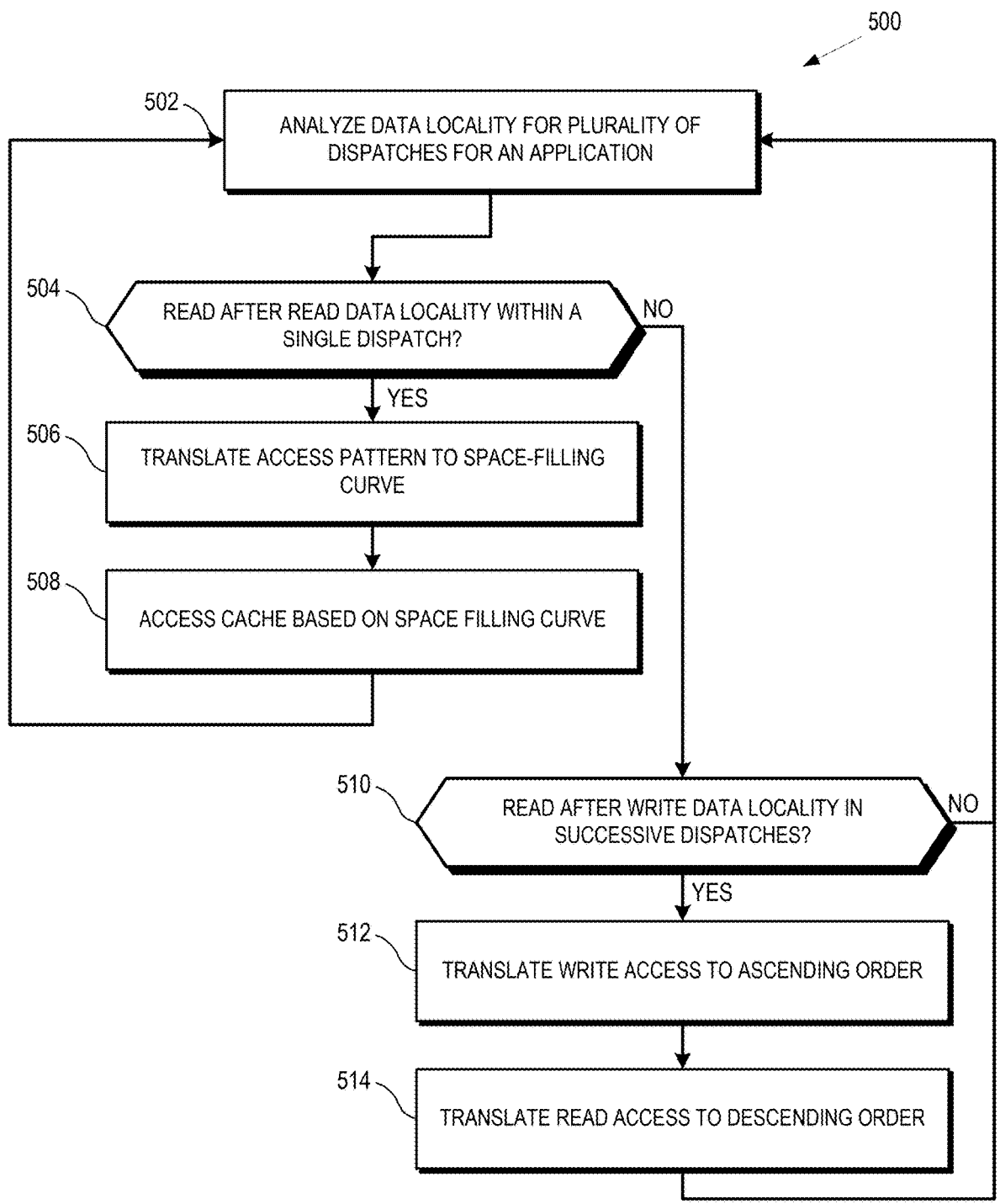
FIG. 5 is a flow diagram illustrating a method for translating a cache access pattern to a space-filling curve or alternating ascending and descending order in accordance with some embodiments.

FIG. 5 is a flow diagram illustrating a method 500 for translating a cache access pattern to a space-filling curve or alternating ascending and descending order based on data locality in accordance with some embodiments. At block 502, the translation module 140 analyzes data locality for a plurality of dispatches 135 of an application 155. At block 504, the translation module 140 determines if read-after-read data locality exists within a single dispatch 135. If, at block 504, the translation module 140 determines that read-after-read locality exists within a single dispatch 135, the method flow continues to block 506. At block 506, the translation module 140 translates the access pattern of the dispatch 135 to a space-filling curve. In some embodiments, the space-filling curve is one of a Z-order, Morton, or Hilbert curve. At block 508, the work items of the dispatch 135 access the cache 120 in an order based on the space-filling curve.

If, at block 504, the translation module 140 determines that read-after-read data locality does not exist for the dispatch 135, the method flow continues to block 510. At block 510, the translation module 140 determines if read-after-write data locality exists in successive dispatches 135. If, at block 504, the translation module 140 determines that read-after-write data locality exists in successive dispatches 135, the method flow continues to block 512. At block 512, the translation module 140 translates the access pattern for the work items of a first dispatch, dispatch 1 310, to an ascending typewriter order. If the initial access pattern for the work items of the first dispatch 310 is an ascending typewriter order, the translation module 140 refrains from translating the access pattern for the first dispatch 310. At block 514, the translation module 140 translates the access pattern for work items of a second dispatch, dispatch 2 320, to a descending typewriter order to facilitate consumption of the data written by the first dispatch 1 310 by the second dispatch 2 320 before the data is evicted from the cache 120. If, at block 510, the translation module 140 determines that read-after-write data locality does not exist in successive dispatches 135, the method flow returns to block 502 for the next dispatch 135.

In some embodiments, the apparatus and techniques described above are implemented in a system including one or more integrated circuit (IC) devices (also referred to as integrated circuit packages or microchips), such as the processing system described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
accessing, at a parallel processing unit of a processing system, data stored at a cache using a first cache access pattern that proceeds in a first order for a first cache access by one or more dispatches of work items; and
accessing data stored at the cache for a second cache access subsequent to the first cache access using a second cache access pattern that proceeds in a second order based on a predicted eviction order of data stored at the cache for an application executing at the processing system.

2. The method of claim 1, wherein the first cache access and the second cache access are included in a single dispatch.

3. The method of claim 1, wherein the first cache access and the second cache access are successive cache accesses that comprise reading data stored at the cache.

4. The method of claim 3, wherein the second cache access pattern comprises a space-filling curve.

5. The method of claim 4, wherein the space-filling curve is one of a pseudo-Hilbert space curve and a Morton space curve.

6. The method of claim 1, wherein the first cache access comprises writing data to the cache for a first dispatch and the second cache access comprises reading the data written to the cache by the first dispatch for a second dispatch.

7. The method of claim 6, wherein the first cache access pattern comprises an ascending typewriter order for the first dispatch and the second cache access pattern comprises a descending typewriter order for the second dispatch.

8. The method of claim 1, further comprising:
analyzing data reuse patterns for data stored at the cache for the first cache access and the second cache access.

9. A method comprising:
selecting, at a parallel processing unit of a processing system, a first access pattern to a cache for a first cache access by a first plurality of work items, the first access pattern comprising an ascending first order;
selecting a second access pattern for a second cache access by a second plurality of work items, the second access pattern comprising a second order based on a predicted eviction order of data stored at the cache for an application executing at the processing system; and
reading, at the parallel processing unit, data stored at the cache in the second order for the second cache access.

10. The method of claim 9, wherein the first plurality of work items and the second plurality of work items are included in a single dispatch.

11. The method of claim 10, wherein the second order comprises a space-filling curve.

12. The method of claim 11, wherein the space-filling curve is one of a pseudo-Hilbert space curve and a Morton space curve.

13. The method of claim 9, wherein the first cache access comprises writing data to the cache for a first dispatch and the second cache access comprises reading the data written to the cache by the first dispatch for a second dispatch.

14. The method of claim 13, wherein selecting the second access pattern for the second cache access comprises selecting a descending order for the second dispatch.

15. The method of claim 14, further comprising:
analyzing data reuse patterns for data stored at the cache for the first cache access and the second cache access.

16. A parallel processing unit comprising:
a cache;
circuitry to select a cache access pattern for each cache access of a plurality of cache accesses by dispatches of work items based on a predicted eviction order of data stored at the cache for an application executing at a processing system; and
at least one compute unit to access data stored at the cache in an order based on the selected cache access pattern for each cache access.

17. The parallel processing unit of claim 16, wherein the plurality of cache accesses are included in a single dispatch and the circuitry is to select a first access pattern for a first access to a space-filling curve for a second access.

18. The parallel processing unit of claim 16, wherein a first cache access of the plurality of cache accesses and a second cache access of the plurality of cache accesses are successive cache accesses that comprise reading data stored at the cache.

19. The parallel processing unit of claim 16, wherein a first cache access of the plurality of cache accesses comprises writing data to the cache for a first dispatch and a second cache access of the plurality of cache accesses comprises reading the data written to the cache by the first dispatch for a second dispatch, and wherein the circuitry is to select an access pattern having an ascending order for the first dispatch and select an access pattern having a descending order for the second dispatch.

* * * * *